United States Patent [19]
Cooper et al.

[11] Patent Number: 5,312,675
[45] Date of Patent: May 17, 1994

[54] PROTECTIVE CLOTHING

[75] Inventors: Graham J. Cooper; Stephen J. Cater, both of Salisbury; David J. Townend, Poole, all of England

[73] Assignee: The Secretary of the State for Defence in Her Britannic Majesty's Government of the United Kingdom of Great Britain and Northern Ireland, London, England

[21] Appl. No.: 988,120

[22] PCT Filed: Jul. 18, 1991

[86] PCT No.: PCT/GB91/01200
§ 371 Date: Feb. 11, 1993
§ 102(e) Date: Feb. 11, 1993

[87] PCT Pub. No.: WO92/02153
PCT Pub. Date: Feb. 20, 1992

[30] Foreign Application Priority Data
Aug. 1, 1990 [GB] United Kingdom ............... 9016915

[51] Int. Cl.$^5$ .................................. B32B 7/02
[52] U.S. Cl. .................................. 428/215; 2/2.5; 428/212; 428/213; 428/218; 428/457; 428/902; 428/911
[58] Field of Search .............. 2/2.5; 428/220, 284, 428/285, 911, 213, 218, 215, 902, 457, 212

[56] References Cited
U.S. PATENT DOCUMENTS

| 3,559,210 | 2/1971 | Hansen | 2/2.5 |
| 3,873,998 | 4/1975 | Norris et al. | 2/2.5 |
| 4,061,815 | 12/1977 | Poole, Jr. | 428/215 |
| 4,704,943 | 11/1987 | McDougal | 428/911 |

FOREIGN PATENT DOCUMENTS

| 2927653 | 1/1981 | Fed. Rep. of Germany . |
| 915345 | 1/1963 | United Kingdom . |
| 1106175 | 3/1968 | United Kingdom . |
| 1556245 | 11/1979 | United Kingdom . |

Primary Examiner—James J. Bell
Attorney, Agent, or Firm—Nixon & Vanderhye

[57] ABSTRACT

An article of protective clothing designed for protection against blast has a first sheet (11) of solid material backed by a second sheet (12) of pneumatic material. The physical properties and dimensions of the two sheet (11, 12) being such that an acoustic decoupling effect is provided which greatly reduces the pressure wave effect on the body of a person wearing the clothing. The first sheet (11) might by of GRP. 9 mm thick with an areal density of 20 kg/square meter and a second sheet (12) of pneumatic material having a nominal thickness of 20 mm. 94% air content and a density of 45 kg cubic meter.

11 Claims, 2 Drawing Sheets

PROTECTIVE CLOTHING

BACKGROUND OF THE INVENTION

1. Field of the Invention

The present invention relates to protective clothing.

2. Discussion of Prior Art

Many types of protective clothing, for use in environments where a wearer may be exposed to fragments or bullets, are known. Efforts have been made to improve the performance of such armour against the effects of air blast (shock, or pressure, waves). However, no protective clothing has yet been developed which is truly effective against shock waves in air.

The effect of blast (which is the direct impact of a shock wave) on a person's body has two effects, namely gross deformation of the body and the transmission of a high velocity stress wave through the body tissue.

It has, in the past, been thought that the lung and bowel injury resulting from the shock wave was caused by deformation of the body, and the design of protective clothing has been based on this premise. It has now been discovered that, in fact, the main damage is caused by the direct coupling of shock waves into the body. This explains the fact that neither solid nor resilient protective clothing have been able to provide the expected protection. Solid clothing contacting a body allows direct transmission of pressure waves, and resilient material, such as foam, may well give an acoustic coupling effect which, as has been discovered, increases the internal injury.

SUMMARY OF THE INVENTION

According to the present invention, an article of protective clothing, including at least two contacting sheets of material, is characterised in having an outer sheet formed of solid material having an areal density of 18 to 22 kg/square meter and a thickness of 8 to 10 mm and an inner sheet or inner sheets formed of a pneumatic material (a resilient material having air filled cavities) having a density of 40-50 kg/cubic meter, an air content of 92-96% and a total thickness of 17 to 23 mm.

The Applicant has found that an article of protective clothing containing this feature, and of a nature no more cumbersome, or heavy, than conventional protective clothing can provide an acoustic decoupling effect which greatly reduces the pressure wave effect on the body of a person wearing the clothing.

Many articles of protective clothing having an outer sheet of solid material and an inner sheet of pneumatic material, usually in combination with further sheets of material, have been described in the Prior art. For example U.S. Pat. No. 3,559,210 and 3,873,998 describe protective clothing intended for protection against missiles such as bullets in which a sheet of solid material has secondary sheets in front and behind, these secondary sheets being designed to prevent injury caused by spall—this is small fragments caused by disintegration of missile and solid sheet material upon impact. These items of protective clothing contain sheets of pneumatic material which is intended to reduce the transmission of impact effects to a wearer's body, to improve comfort, or both. Similar articles of protective clothing, also intended for protection against missiles are described in UK Patent 915,345; 1,106,175 and 1,556,245 and in UK Patent Application 2,210,773A. All the prior art documents are concerned with protection against missiles and none mention the effects of blast. Where physical properties and dimensions are mentioned these do not impinge on those required by the present invention. These prior art articles might be expected to give only limited protection against blast, and, in some cases, as explained above, might actually increase blast effects.

In one form of the invention, the outer sheet may be formed of Fibre Reinforced Plastic (FRP), preferrably Glass Fibre Reinforced Plastic (GRP), of metal, or of a ceramic material; and may have a thickness of 0.9 mm and an areal density of 20 kg/square meter.

The article might have a single inner sheet, which might have a density of 45 kg/cubic meter, an air content of 94% and a nominal thickness of 20 mm. Alternatively, the article might have two inner sub-sheets formed of the pneumatic material, the sub-sheets being separated by a dividing sheet which might typically be 0.40 to 0.44 mm thick and having an areal density of 4.5 to 4.9 kg/square meter. The dividing sheet might, for example, be formed of iron, steel, lead or lead filled plastic material.

The pneumatic material might be, for example, Plastazote (RTM) a product of BXL Plastics Limited of Mitcham Road, Croydon, England.

BRIEF DESCRIPTION OF THE DRAWINGS

Some embodiments of the invention will now be described, by way of example only, with reference to the accompanying diagrammatic drawings, of which.

DETAILED DISCUSSION OF PREFERRED EMBODIMENTS

Figure 1:
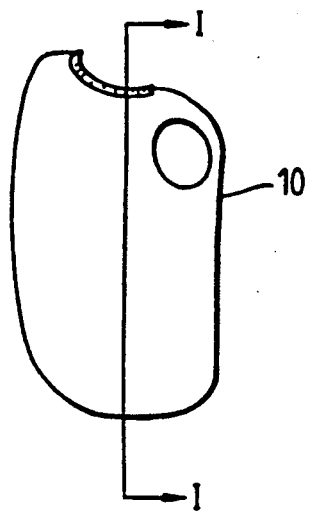
FIG. 1 is a perspective view of an article of protective clothing.

An article of protective clothing shown generally at 10 in FIG. 1 consists (FIG. 2) of an outer sheet 11 of GRP material, 9 mm thick and having an areal density of 20 kg/square meter, which is in contact with an inner sheet 12 of pneumatic material, such as Plastazote (RTM), having a nominal thickness of 20 mm and an air content of 94% and a density of 45 kg/cubic meter.

In an alternative form of the invention (FIG. 3) a dividing sheet 13 of lead, 0.42 mm thick and having an areal density of 4.7 kg/square meter, separates two sub-sheets 14, 15 of pneumatic material, the combined thickness of the two sub-sheets being substantially the same as that of the inner sheet 12 of the first embodiment.

Alternative materials for the various layers are, of course, possible. For example steel or another metal, or some FRP material other than GRP, may be used for the outer sheet 11, and iron or lead filled plastic for the dividing sheet 13. The physical properties and dimensions for best effect will then vary slightly compared with those quoted above.

Those skilled in the art will be aware that accosting decoupling effects are frequency responsive, and that care must be taken in designing the clothing to ensure that decoupling rather than coupling occurs. The Applicant has found that, in general, the thickness of the outer and inner sheets to give satisfactory results lie within the range of thicknesses commonly used in conventional clothing of this type.

Figure 2:
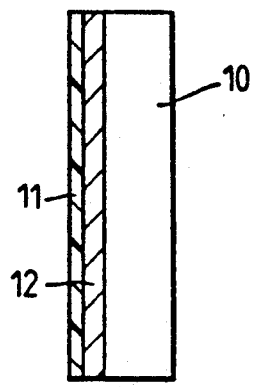
FIG. 2 is an elevation, in section along line 1—1 of FIG. 1 of one embodiment of the invention.
Figure 3:
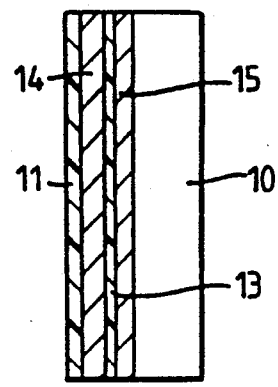
FIG. 3 is an elevation, in section along line 1—1 of FIG. 1 of another embodiment of the invention.
Figure 4:
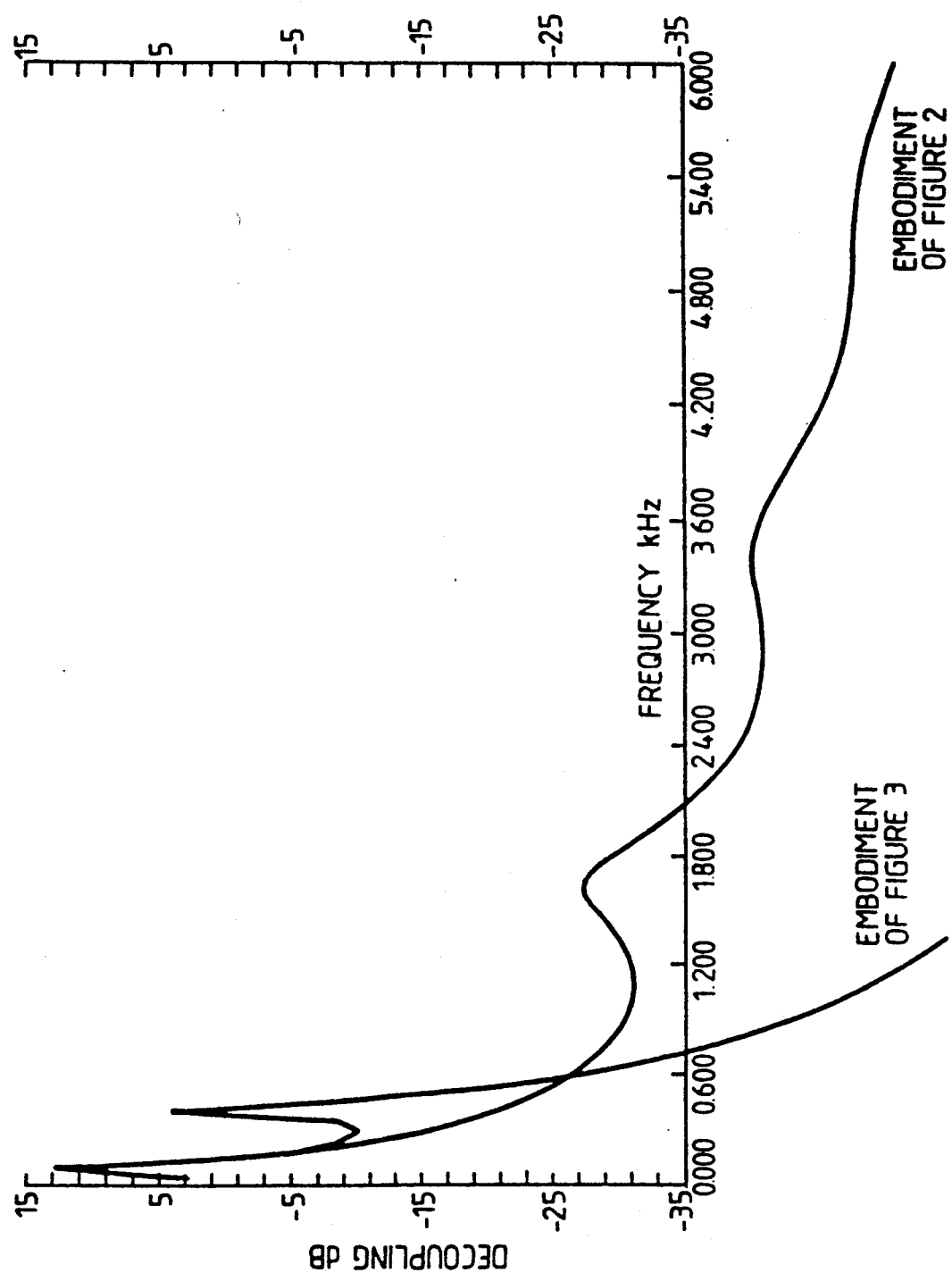
FIG. 4 is a graph of the decoupling effects of the embodiments of FIGS. 2 and 3.

The two embodiments of the invention illustrated in FIGS. 2 and 3 were tested for their decoupling effect in transmitting shock waves from air to water over a frequency band of 0-6.25 kHZ. The results are shown in FIG. 4, from which it can be seen that the layer version gives improved decoupling at the frequencies, greater than 1.5 kHz, considered to result in lung and bowel injuries.

Figure 5:
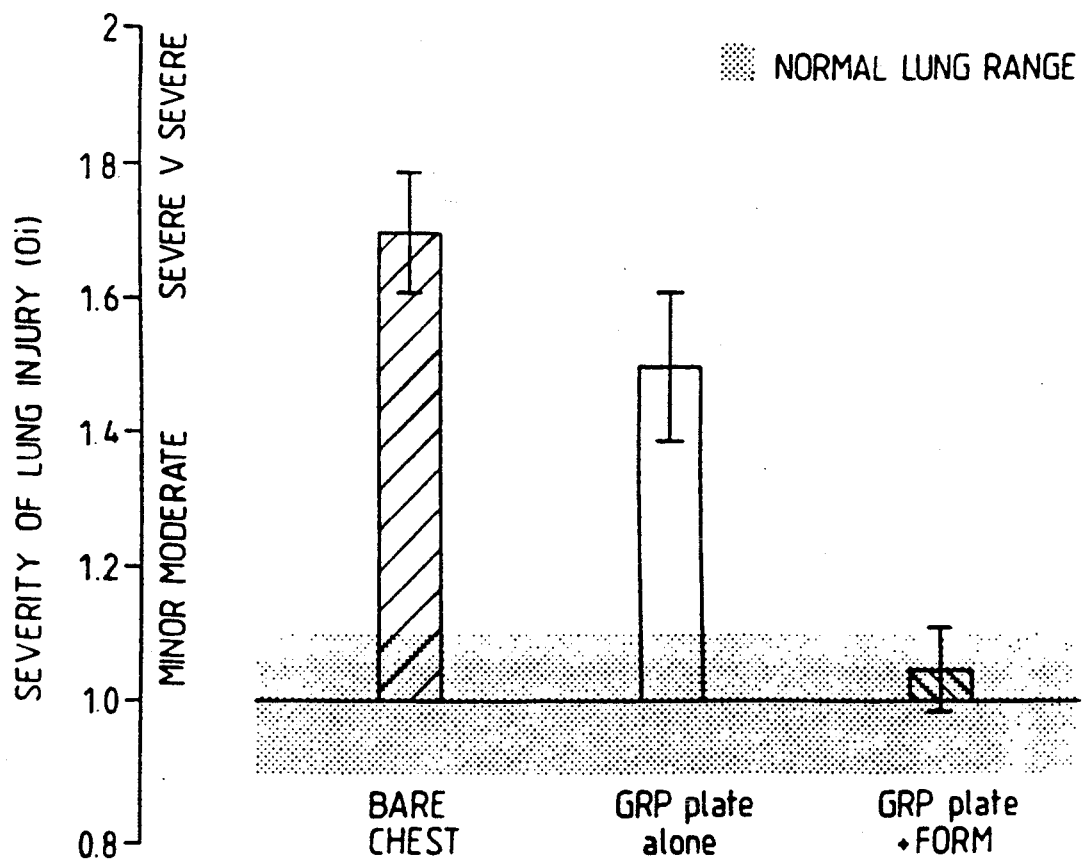
FIG. 5 is a Bar Chart showing effects of blast with various protection.

The results translated into their effect in preventing blast damage to a body are shown in FIG. 5, where $Q_i$ is the "quotient of lung injury", and equals Actual lung weight divided by Predicted normal lung weight, and the blast overpressure to which the results relate was 300-400 kPa incident (1100-1700 kPa reflected).

In some embodiments of the invention, more dividing sheets 13 might separate further sub-sheets 14, 15.

What is claimed is:

1. An article of protective clothing, comprising:
   an outer sheet formed of solid material having an areal density of 18 to 22 kg/square meter and a thickness of 8 to 10 mm; and
   at least one inner sheet contacting said outer sheet and of a pneumatic material having a density of 40-50 kg/cubic meter, an air content of 92-96% and a total thickness of 17 to 23 mm.

2. An article as claimed in claim 1 wherein the outer sheet is formed of one of FRP, metal, and a ceramic material.

3. An article as claimed in claim 2 wherein outer sheet is formed of GRP.

4. An article as claimed in claim 3 wherein thickness of the outer sheet is 0.9 mm.

5. An article as claimed in claim 3 wherein the outer sheet has an areal density of 20 kg/square meter.

6. An article as claimed in claim 1 wherein said at least one inner sheet has a density of 45 kg/cubic meter, an air content of 94% and a nominal thickness of 20 mm.

7. An article as claimed in claim 1 wherein said at least one inner sheet comprises two inner sub-sheets formed of the pneumatic material, and a dividing sheet separating said two inner sub-sheets, said dividing sheet having a thickness of from 0.40 to 0.44 mm and having an areal density of 4.5 to 4.9 kg/square meter.

8. An article as claimed in claim 7 wherein said the dividing sheet (13) is formed of iron, steel, lead or lead filled plastic material.

9. An article as claimed in claim 8 wherein the dividing sheet is of lead.

10. An article as claimed in claim 9 wherein the dividing sheet is 0.42 mm thick and has an areal density of 4.7 kg/square meter.

11. An article as claimed in claim 4 wherein the outer sheet has an area density of 20 kg/square meter.

* * * * *